United States Patent [19]

Kojima

[11] Patent Number: 4,917,360

[45] Date of Patent: Apr. 17, 1990

[54] OPERATING DEVICE FOR ELECTRIC CHAIN BLOCK

[75] Inventor: Yasuhiro Kojima, Kawasaki, Japan

[73] Assignee: Kabushiki Kaisha Kito, Japan

[21] Appl. No.: 90,627

[22] Filed: Aug. 28, 1987

[30] Foreign Application Priority Data

Aug. 29, 1986 [JP] Japan ................................ 61-203512

[51] Int. Cl.[4] ............................ B66D 1/12; H02P 5/06

[52] U.S. Cl. .................................... 254/362; 200/298; 250/211 K; 318/480

[58] Field of Search ............... 254/270, 277, 358, 362, 254/361, 372, 380, 360; 318/313, 480; 200/298; 250/211 K, 229, 221

[56] References Cited

U.S. PATENT DOCUMENTS

| | | | |
|---|---|---|---|
| 2,939,680 | 6/1960 | Powell | 254/361 X |
| 3,580,157 | 5/1971 | Casebeer | 250/229 X |
| 3,859,617 | 1/1975 | Oka et al. | 250/211 K X |
| 3,902,104 | 8/1975 | Freeman | 318/313 |
| 3,921,959 | 11/1975 | Ulbing | 254/270 |
| 3,940,110 | 2/1976 | Motoda | 254/270 |
| 3,948,487 | 4/1976 | Motoda | 254/362 |
| 3,998,432 | 12/1976 | Uldricks et al. | 254/386 |

FOREIGN PATENT DOCUMENTS 07042 12/1986 PCT Int'l Appl. ................. 254/360

*Primary Examiner*—Stuart S. Levy
*Assistant Examiner*—Joseph J. Hail, III

[57] ABSTRACT

An operating device for an electric chain block having an electric motor for a raising and lowering operation comprises a cylinder body interposed between one end of a chain for raising and lowering an object and a hook for hanging the object, a cylindrical grip fitted on the cylinder body and slidable upwardly and downwardly over predetermined distances relative to the cylinder body. The device further comprises a movement detecting device provided in the cylinder body for detecting upward and downward movements of the cylindrical grip, a moved distance detecting device provided in the cylinder body for detecting distances of the upward and downward movements of the cylindrical grip, and control device for energizing the electric motor to rotate it in normal and reverse directions in response to output of the movement detecting devce according to the upward and downward movements of the cylindrical grip, respectively, and controlling rotating speeds of the electric motor in response to output of the moved distance detecting device. Changing the raising and lowering operations and controlling the speeds of the operations are effected by an operator in the same sense as the operator raises and lowers a heavy object by himself.

3 Claims, 8 Drawing Sheets

Normal Rotation

Reverse Rotation

OPERATING DEVICE FOR ELECTRIC CHAIN BLOCK

BACKGROUND OF THE INVENTION

This invention relates to an operating device for an electric chain block for changing winding-up and -off operations and controlling raising and lowering speeds.

There have been operating devices for electric chain blocks for the above operation and control. In general, such a hitherto used operating device comprises an operating box which moves independently of movement of a chain or hook. There are provided in the operating box push-buttons for raising and lowering operations and speed control means including a potentiometer and like for determining winding-up and -off speeds in step or stepless manner. An operator actuates the push-buttons and the speed control means to change the raising and lowering operations and control the winding-up and -off speeds in no direct connection with movement of the chain or hook.

Recently, working conditions have been improved. For example, weights of heavy objects to be carried by laborers have been severely limited and a regulation prohibits a laborer from being forced to carry an object heavier than a determined weight. Under such circumstances, an electric chain block has been expected which is simple in construction and easy to operate as if the chain block were hands and feet of a laborer.

In view of simplicity in operation of the chain block, it is preferable for the laborer to operate the chain block in the same sense as he lifts up a heavy object by himself. In order to realize such an ideal electric chain block, it is considered important to construct the electric chain block in a manner such that when it is desired to raise or lower a heavy object, the chain block immediately starts raising and lowering only by raising or lowering an operating box by an operator. Moreover, it is more preferable to control winding-up and -off speeds by raising and lowering distances of the operating box in order to simplify the operation of the electric chain block.

However, with the hitherto used operating devices for the electric chain blocks, the raising and lowering operations are changed and winding-up and -off speeds are controlled with no relation to the movement of the chain or hook as above described. An operator thus operates the electric chain block in a sense quite different from that when he is lifting a heavy object by himself. Therefore, the hitherto used electric chain blocks are lacking in simplicity of operation.

SUMMARY OF THE INVENTION

It is a principle object of the invention to provide an improved operating device for an electric chain block, which eliminates all the disadvantages of the prior art and is capable of changing raising or lowering operations and controlling winding-up and -off speeds in the same sense as an operator raises and lowers a heavy object by himself.

In order to achieve this object, the operating device for an electric chain block having an electric motor for a raising or lowering operation according to the invention comprises a cylinder body interposed between one end of a chain for raising and lowering an object and a hook for hanging the object, a cylindrical grip fitted on said cylinder body and slidable upwardly and downwardly over predetermined distances relative to said cylinder body, movement detecting means provided in the cylinder body for detecting upward and downward movements of said cylindrical grip, moved distance detecting means provided in the cylinder body for detecting distances of said upward and downward movements of the cylindrical grip, and control means for energizing said electric motor to rotate it in normal and reverse directions in response to output of said movement detecting means according to the upward and downward movements of said cylindrical rotating speeds of said electric motor in response to output of said moved distance detecting means.

In a preferred embodiment, the movement detecting means comprises limit switches actuated by the upward and downward movements of the cylindrical grip, respectively, and the moved distance detecting means comprises a light emission element, a light reception element and light changing means for changing amount of light received in the light reception element in response to distances of the upward and downward movements of the cylinder grip.

The light changing means is preferably a plate-like body formed with a pair of trapezoid slits and movable together with said cylindrical grip.

In a further embodiment, the moved distance detecting means comprises a potentiometer and a lever for operating the potentiometer or comprises magnet elements and a hall element.

In order that the invention may be more clearly understood, preferred embodiments will be described, by way of example, with reference to the accompanying drawings.

DESCRIPTION OF THE PREFERRED EMBODIMENTS

Figure 3:
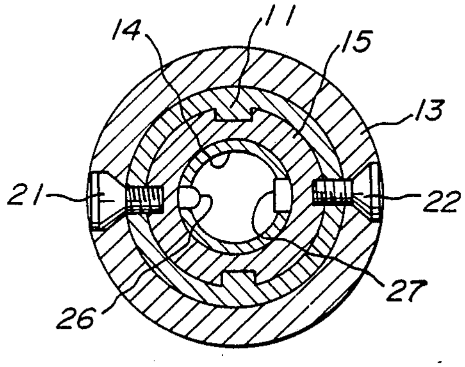
FIG. 3 is a sectional view of the operating device taken along the line III—III in FIG. 1.
Figure 4:
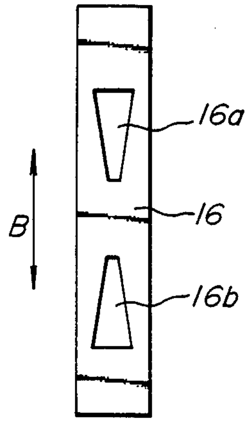
FIG. 4 is a plan view illustrating a slit member used in the operating device shown in FIG. 1.
Figure 5:
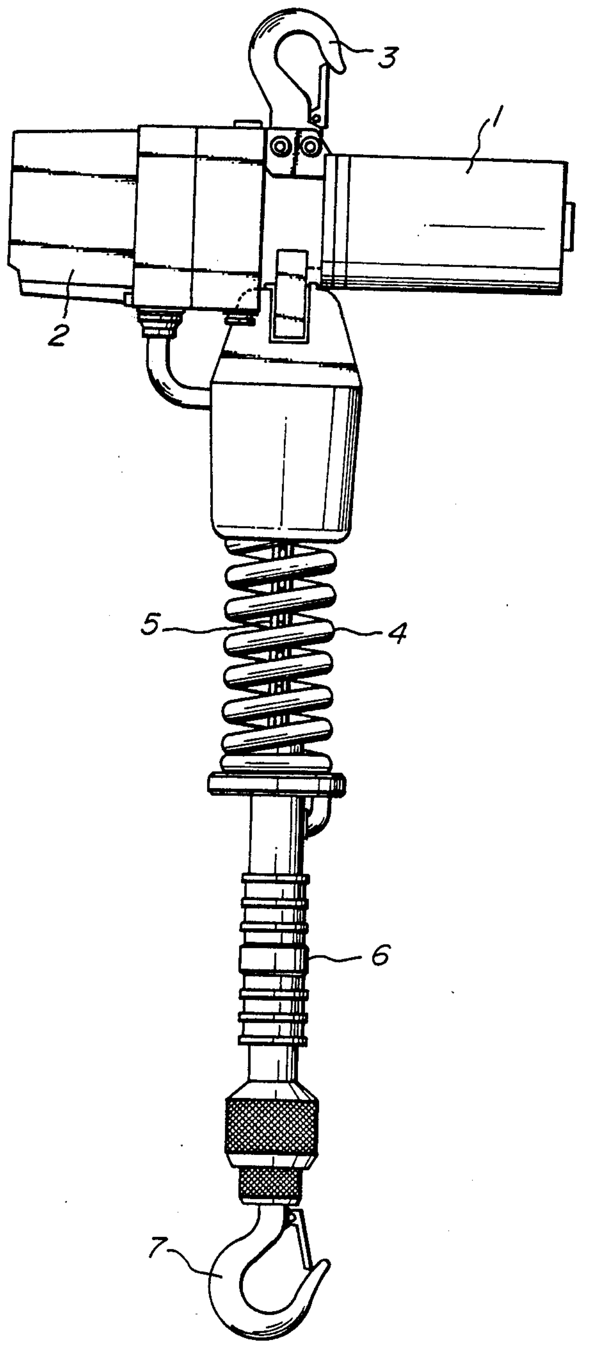
FIG. 5 is a view illustrating a chain block equipped with the operating device according to the invention.

FIGS. 1–4 illustrate an arrangement of operating members of an operating device for an electric chain block according to the invention. FIG. 5 shows the electric chain block in its entirety.

As shown in FIG. 5, the electric chain block comprises an electric motor 1 for raising and lowering, an electric equipment housing 2 for accommodating various electric equipment, a hook 3 for hanging the electric chain block from a structure at a ceiling, a cable 4 spirally wound, a chain 5, an operating portion 6, a hook 7 for hanging a load, and the like. As later described, with the operating device according to the invention, a heavy object hanging from the hook can be freely raised or lowered only by raising or lowering a grip of the operating portion 6 by an operator. A construction of the operating portion 6 will be explained in detail hereinafter.

Figure 1:
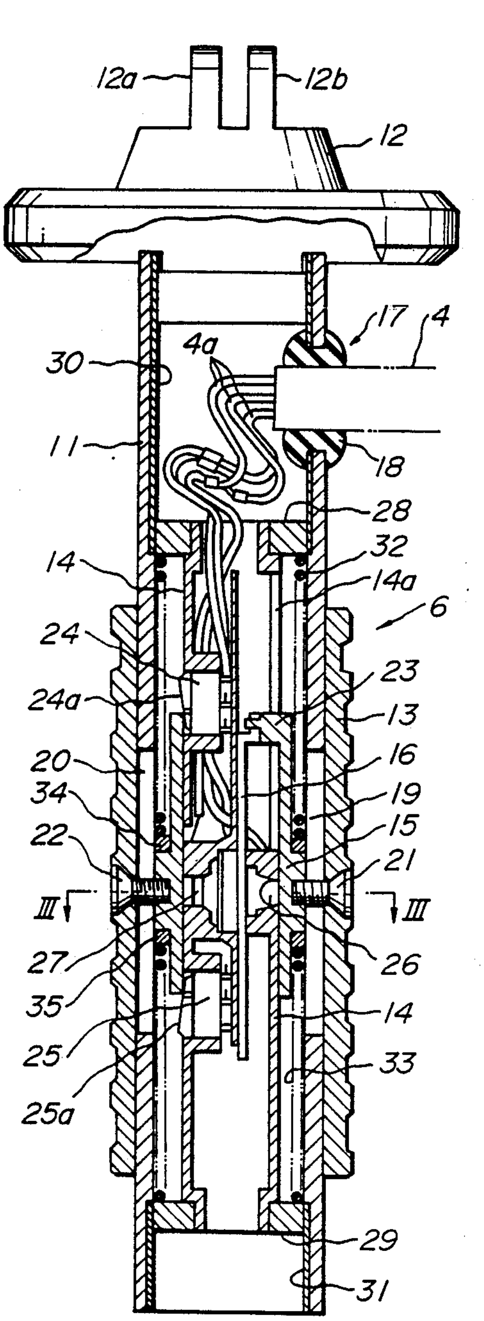
FIG. 1 is a longitudinal sectional view of an operating device for an electric chain block according to the invention.
Figure 2:
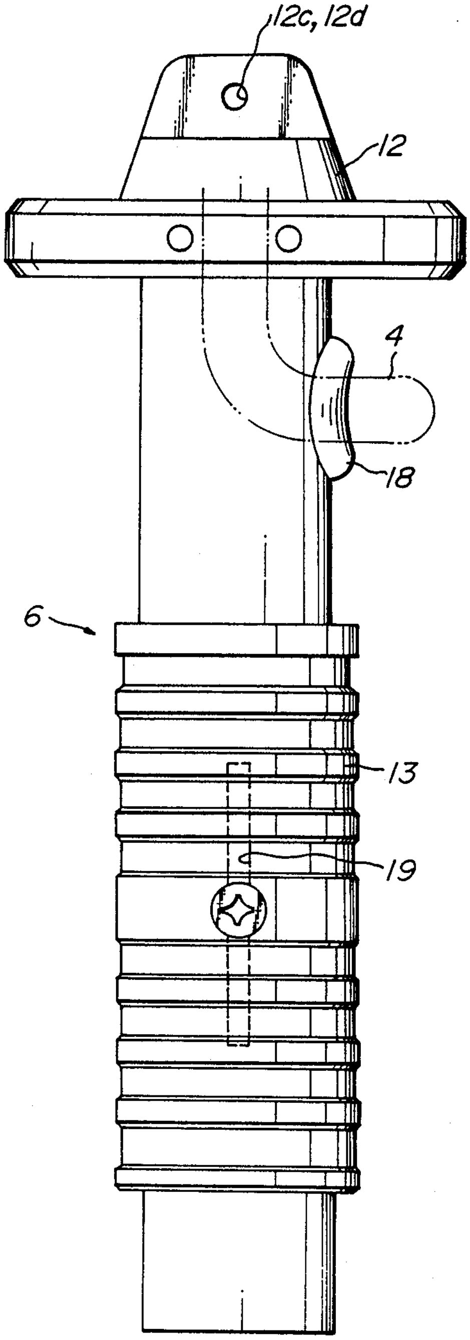
FIG. 2 is a front elevation illustrating the operating device as a whole.

FIG. 1 is a longitudinal sectional view of the operating portion 6 whose outline is shown in a front elevation of FIG. 2. FIG. 3 is a cross-sectional view taken along a line III—III in FIG. 1.

As shown in FIG. 1, a cylinder body 11 made of a rigid material such as steel is provided at an upper portion with a bracket 12 fixed thereto for engaging the cylinder body 11 with an end of the chain 5. The bracket 12 is provided at an upper portion with a pair of flanges 12*a* and 12*b* for fitting the end of the chain 5 therebetween. The flanges 12*a* and 12*b* are formed in their centers with pin apertures 12*c* and 12*d*. After the end of the chain 5 has been fitted between the flanges 12*a* and 12*b*, a fixing pin is passed through pin apertures 12*c* and 12*d* formed in centers of the flanges and fixed thereat, thereby firmly securing the bracket 12 to the end of the chain 5.

The cylinder body 11 is provided on its outer circumference with a cylindrical grip 13 fitted thereon vertically slidably. There are provided in the cylinder body 11 a part fixing member 14 for fixing respective members, a linked member 15 vertically movable in response to vertical movements of the cylindrical grip 13, a slit member 16 having one end fixed to the linked member 15, and the like.

The cylinder body 11 is formed in its upper portion with an aperture 17, within which is fitted a packing 18. The packing 18 has a center aperture into which one end of the cable 4 is inserted. The cylinder body 11 is formed at a mid portion with two diametrically opposed elongated apertures or slots 19 and 20 for guiding the cylindrical grip vertically moving. The cylindrical grip 13 and the linked member 15 are fixed to each other by means of set screws 21 and 22. When the cylindrical grip 13 is moved vertically, shanks of the set screws 21 and 22 vertically move in the elongated apertures or slots 19 and 20.

The linked member 15 is integrally formed at its upper portion with a protrusion 23 adapted to be inserted into an elongated aperture or slot 14*a* formed in the part fixing member 14. A slit member 16 having a configuration shown in FIG. 4 is fixed to an end of the protrusion 23. When the cylindrical grip 13 is moved upwardly and downwardly, the protrusion 23 of the linked member 15 is moved upwardly and downwardly guided in the slot 14*a* together with the slit member 16.

Limit switches 24 and 25 for detecting the vertical movement of the linked member 15 are provided on the part fixing member 14 at locations in the proximity of the upper and lower ends of the linked member 15 when it is at a mid position relative to the cylinder body 11. The limit switches 24 and 25 have levers 24*a* and 25*a* which are urged or released to turn the limit switches 24 and 25 on or off when the linked member 15 is moved upwardly and downwardly.

A light emission element 26 such as light emission diode is arranged at a mid portion of the part fixing member 14 and a light reception element 27 such as CDS or the like is arranged in opposition to the light emission element 26 for receiving light beams from the light emission element 26. The slit member 16 is positioned between the light emission element 26 and the light reception element 27. The slit member 16 is made of a plate-like body and is formed with a pair of trapezoid slits 16*a* and 16*b* at a mid portion of its length as shown in FIG. 4. When the linked member 15 is moved upwardly and downwardly, the slit member 16 is also moved in the same directions as shown by an arrow B. The amount of light emitted from the light emission element 26 and arriving at the light reception element 27 is regulated and changed by the slits 16*a* and 16*b* when the slit member is moved vertically as later explained.

The part fixing member 14 is fixed at its upper and lower ends to the cylinder body 11 with the aid of fixing members 28 and 29. Coil springs 32 and 33 are arranged in the cylinder body 11 so that one of their ends abut against the fixing member 28 and 29 and the other ends abut against spring supports 34 and 35, respectively. The spring supports 34 and 35 are annular and are vertically moved in the cylinder body 11 together with the linked member 15 in the cylinder body 11. The linked member 15 is urged by the coil springs 32 and 33 to be maintained at the mid portion of the cylinder body 11.

Core wires 4*a* of the cable 4 extend through the cylinder body 11 and the part fixing member 14 and are connected to the limit switches 24 and 25, the light emission element 26 and the light reception element 27.

Although the cylinder body 11 is made of a rigid metal such as steel, insulators 30 and 31 are attached to inner surfaces of the upper and lower portions of the cylinder body 11, and the fixing members 28 and 29, the grip 13, the part fixing member 14 and the linked member 15 are made of insulating materials so that the cylinder body 11 is maintained in an insulated condition. The hook 7 is fixed to the lower end of the cylinder body 11 as shown in FIG. 5.

With the operating device for the electric chain block constructed as above described, the linked member 15, the slit member 16 and the grip 13 are maintained at the mid portion of the cylinder body 11 by means of the spring force of the coil springs 32 and 33, in which condition, the limit switches 24 and 25 are off and at the same time the light beams emitted from the light emission element 26 is shut off by a center portion of the slit member 16 so as not to arrive at the light reception element 27. Under such a condition, the electric motor 1 is deenergized as later described.

Under this condition, when the cylinder grip 13 is raised against the coil spring 32, the lever 24*a* of the limit switch 24 is depressed by the linked member 15 to turn the limit switch 24 on. The limit switch 24 is for the raising operation of the electric chain block as later described. The electric motor 1 is energized to rotate in a normal direction when the limit switch 24 is turned on. At this moment, the light beam emitted from the light emission element 26 is transmitted through the slit 17*b* of the slit member 16 onto the light reception element 27. The amount of the light beam received in the element 27 is regulated by widths of the slit 16*b*, so that the narrower the width, the smaller is the amount of the received light beam, while the wider the width, the larger is the amount of the received light beam. Accordingly, the smaller the raised distance of the cylinder grip 13, the smaller is the amount of the received light beam, and the larger the raised distance, the larger is the amount of the received light beam.

In contrast herewith, when the cylinder grip 13 is lowered against the coil spring 33, the limit switch 25 is turned on. The limit switch 25 is for the winding-off operation of the electric chain block as later described. When the limit switch 25 is turned on, the electric motor 1 is energized to rotate in a reverse direction. At this time, the light beam emitted from the light emission element 26 is transmitted through the slit 16*a* of the slit member 16 onto the light reception element 27. The smaller the lowered distance of the cylinder grip 13, the smaller is the amount of the received light beam, while the larger the lowered distance, the larger is the amount of the received light beam.

The amount of the light beam received in the light reception element 27 is related to rotating speeds of the electric motor 1 in the normal or reverse directions as later explained. The smaller the amount of the received light beam, the lower is the rotating speed of the motor 1, while the larger the amount of the light beam, the higher is the rotating speed of the motor 1. In other words, the rotating speed of the electric motor in the normal or reverse direction caused by the upward or downward movement of the grip 13 depends upon the raised or lowered distance of the grip 13. The smaller the moved distance of the grip 13, the lower is the rotating speed, while the larger the moved distance, the higher is the rotating speed.

Figure 6:
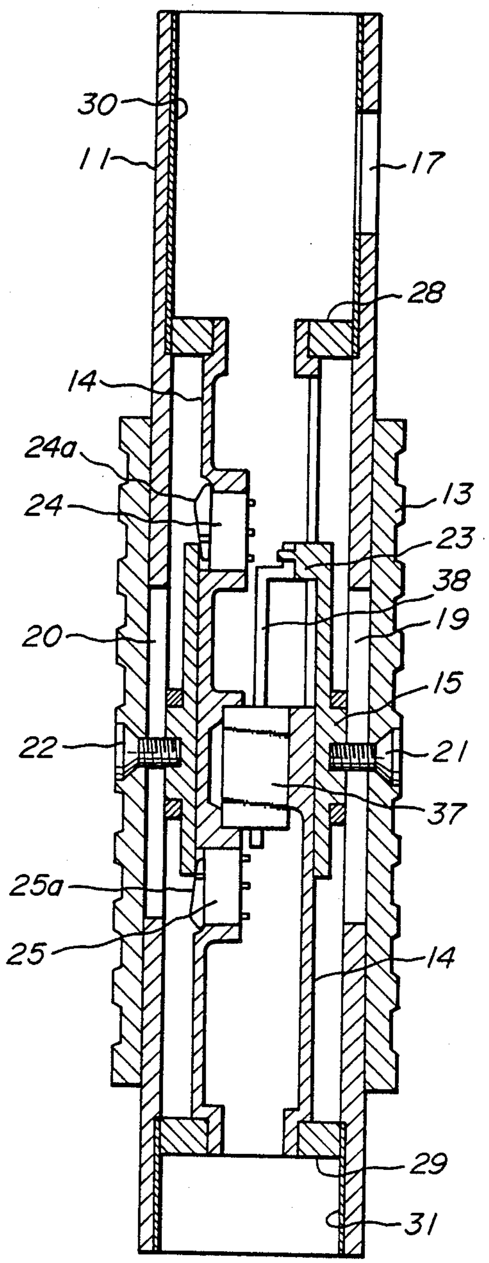
FIG. 6 is a sectional view of an operating device of another embodiment of the invention.

FIG. 6 illustrates another embodiment of the operating device according to the invention, in which like or equivalent components are designated by the same reference numerals as those in FIGS. 1–4 and will not be described in further detail. In FIG. 6, coil springs 32 and 33 and a cable 4 are removed for the sake of clarity.

A potentiometer 37 is fixed to a part fixing member 14 substantially at a mid portion thereof. A lever 38 is fixed at its upper portion to a protrusion 23 of the linked member 15 for operating the potentiometer 37.

With the operating device shown in FIG. 6, a grip 13 is moved upwardly or downwardly to turn limit switch 24 or 25 on or off in the same manner as in FIGS. 1–4. The operating device shown in FIG. 6 is different from that shown in FIGS. 1–4 in the feature that when the grip 13 is moved upwardly or downwardly, the lever 38 is also moved upwardly or downwardly to change output of the potentiometer 37. For example, as the raised or lowered distance of the grip 13 becomes larger, the positive or negative output of the potentiometer 37 is large. Therefore, the rotating speed of the motor 1 in normal or reverse direction is changed by the output of the potentiometer 37.

Figure 7:
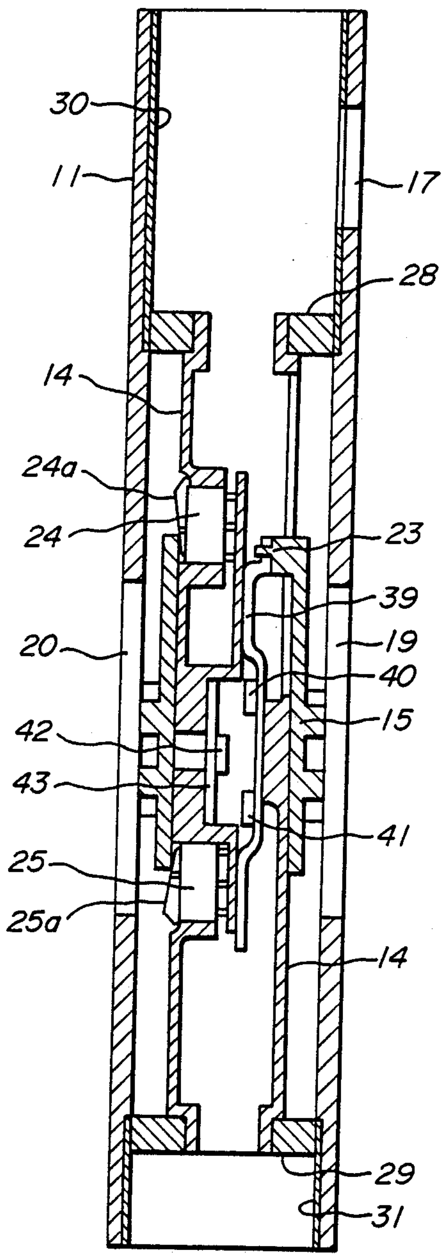
FIG. 7 is a sectional view of an operating device of a further embodiment of the invention.

FIG. 7 illustrates a further embodiment of the operating device according to the invention, wherein like or equivalent components are designated by the same reference numerals as those in FIGS. 1–4 and will not be described in further detail. In FIG. 7, coil springs 32 and 33, a grip 13 and a cable 4 are removed for the sake of clarity.

A magnet fixing member 39 is fixed at its upper end to a protrusion 23 of a linked member 15 so that the magnet fixing member 39 is moved upwardly and downwardly in response to the upward and downward movement of the linked member 15. Magnets 40 and 41 spaced apart from each other by a predetermined distance are fixed in place to the magnet fixing member 39. A hall element 42 in response to change in magnetic field of the magnets 40 and 41 is fixed to a part fixing member 14 through a fixing member 43 at a location in opposition to a center position between the magnets 40 and 41.

With the operating device as above described, when the grip 13 (not shown) is moved upwardly or downwardly, a limit switch 24 or 25 is turned on or off in the same manner as in FIGS. 1–4. In this embodiment, the magnet fixing member 39 is moved upwardly or downwardly together with the grip 13 to cause the magnets 40 and 41 to move in the same direction, thereby changing the output of the hall element 42. Rotating speeds of the electric motor 1 in the normal or reverse direction are changed depending upon the output of the hall element 42. Although the magnets 40 and 41 have been provided on the fixing member 39 and the hall element 42 has been provided on the part fixing member 14, the magnets may of course be provided on the part fixing member 14 and the hall element 42 may be provided on the fixing member 39.

Figure 8:
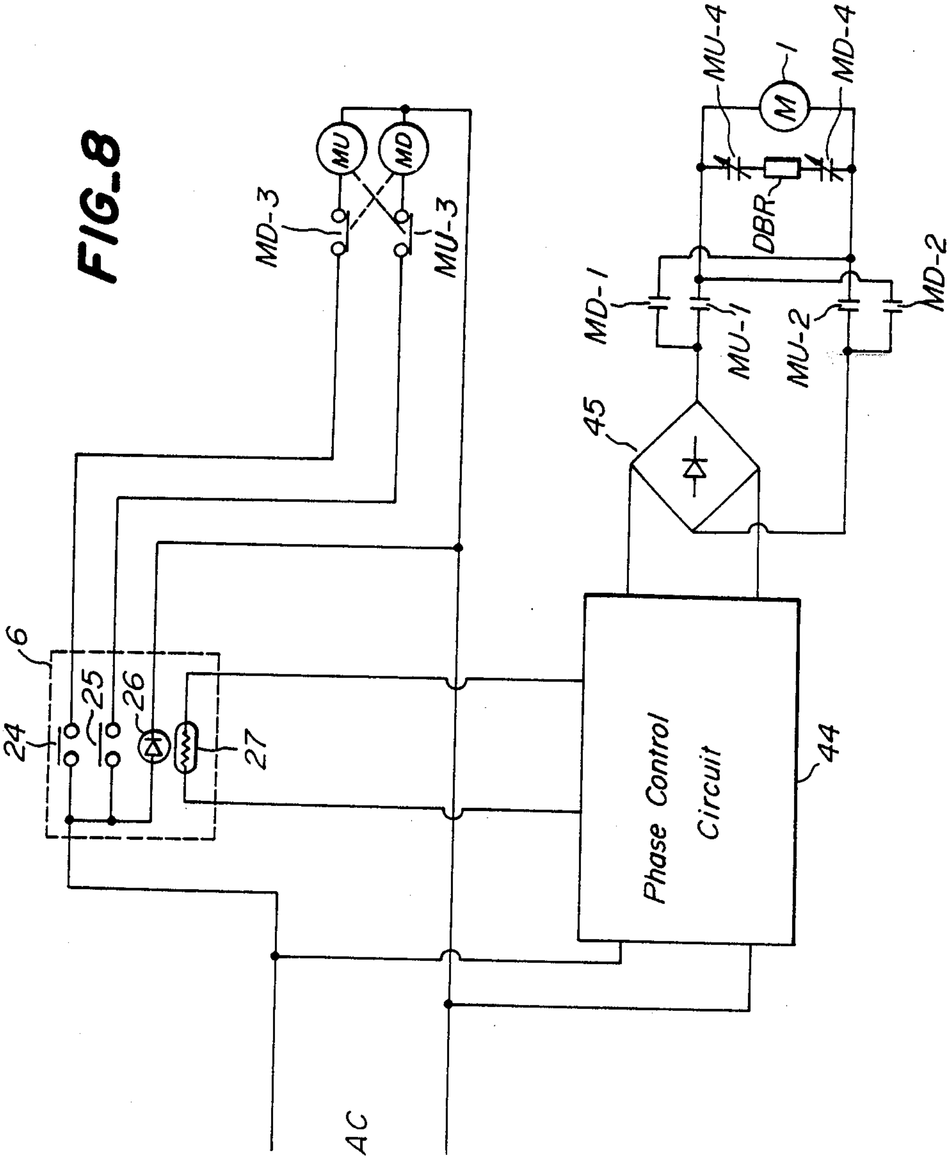
FIG. 8 illustrates one example of a circuit for controlling the operating device according to the invention.

FIG. 8 illustrates a control circuit for controlling the electric motor 1 by signals from the operating device as shown in FIGS. 1–4. In FIG. 8, the same parts are denoted by the same reference numerals as those in FIGS. 1–4.

The circuit comprises a phase control circuit 44, and a full-wave rectifying circuit 45. A relay MU for the raising operation includes normally opened contact pair MU-1 and MU-2 and normally closed contact pair MU-3 and MU-4. A relay MD for the raising operation includes normally opened contact pair MD-1 and MD-2 and normally closed contact pair MD-3 and MD-4. A dynamic brake resistor is indicated by DBR.

Figure 9A:
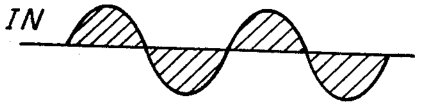
FIGS. 9*a* and 9*b* illustrate waveforms of input and output of a phase control circuit in the circuit shown in FIG. 8, respectively.
Figure 9B:
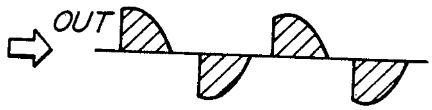

Alternating current of a wave form shown in FIG. 9*a* is inputted into the phase control circuit 44 and is controlled in phase in the circuit 44 dependent upon the output of the light reception element 27. The A.C. controlled in phase in the circuit 44 and outputted therefrom has a waveform shown in FIG. 9*b*.

With the control circuit as above described, when the grip 13 of the operating portion 6 is raised, the limit switch 24 is turned on the actuate the relay MU for a raising operation so as to close the normally opened contact pair MU-1 and MU-2 and open the normally closed contact pair MU-3 and MU-4. The light beam from light emission element 26 is regulated by the slit 16*b* of the slit member 16 and is transmitted into the light reception element 27. The output from the light reception element 27 dependent upon the amount of the received light beam is inputted into the phase control circuit 44. The alternate current of the waveform shown in FIG. 9*b* controlled in phase dependent upon the amount of the received light beam is outputted from the phase control circuit into the full-wave rectifying circuit 45.

Figure 10A:
FIGS. 10*a* and 10*b* illustrate waveforms when the electric motor is rotated in normal and reverse directions, respectively.

At this moment, as the normally opened contact pair MU-1 and MU-2 of the relay MU for the raising operation, the output from the full-wave rectifying circuit 45 becomes a direct current of a waveform shown in FIG. 10*a*, which is then supplied into the electric motor 1. As a result, the electric motor 1 is energized to rotate in the normal direction with a rotating speed according to the amount of light beam received in the light reception element 27 or the raised distance of the grip 13. The smaller the raised distance, the lower is the rotating speed of the motor, while the larger the raised distance, the higher is the rotating speed of the motor.

In contrast herewith, when the grip 13 is lowered, the limit switch 25 is turned on to actuate the relay MD for a lowering operation so as to close the normally opened contact pair MD-1 and MD-2 and open the normally closed contact pair MU-3 and MU-4. The light beam from the light emission element 26 is regulated by the slit 16*a* of the slit member 16 and is transmitted into the light reception element 27. The output from the light reception element 27 dependent upon the amount of the received light beam is inputted into the phase control circuit 44.

Figure 10B:
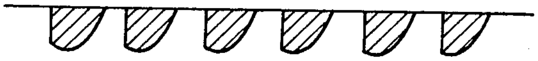

At this time, as the normally opened contact pair MD-1 and MD-2 of the relay MD for the lowering operation is closed, the output from the full-wave rectifying circuit 45 becomes a direct current of a waveform shown in FIG. 10*b*, which is then supplied into the electric motor 1. As a result, the electric motor 1 is energized to rotate in the reverse direction with a rotating speed corresponding to the lowered distance of the grip 13. The smaller the lowered distance, the lower is the rotating speed, while the larger the lowered distance, the higher is the rotating speed.

Figure 11:
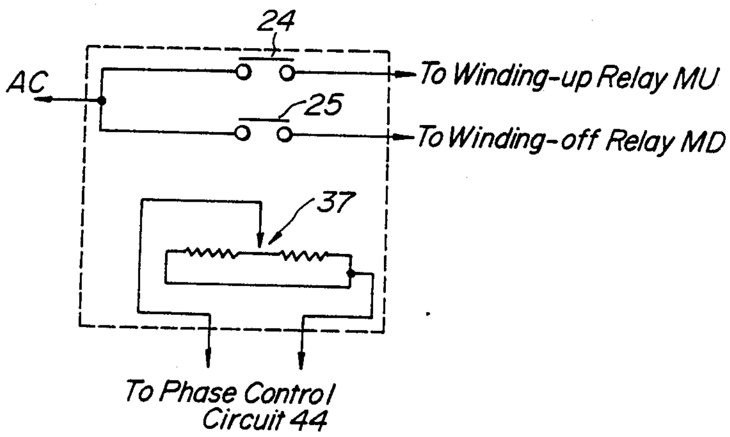
FIG. 11 illustrates a circuit for the operating device shown in FIG. 6.

FIG. 11 illustrates a circuit for the operating device shown in FIG. 6. As shown in FIG. 11, the output from the potentiometer 37 is inputted into the phase control circuit 44 in which alternate current is controlled in phase according to the output of the potentiometer 37.

Figure 12:
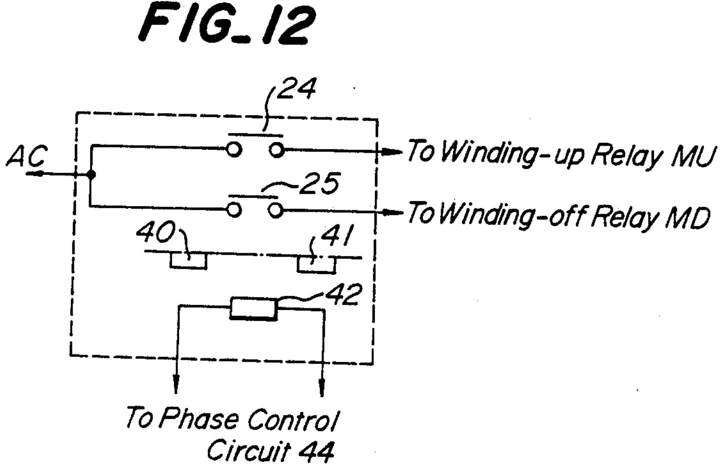
FIG. 12 illustrates a circuit for the operating device shown in FIG. 7.

FIG. 12 shows a circuit for the operating device shown in FIG. 7. As shown in FIG. 12, the output from the hall element 42 is inputted into the phase control circuit 44, wherein alternate current is controlled in phase according to the output of the hall element 42.

As can be seen from the above explanation, when an operator wishes to raise or lower a heavy object by the electric chain block according to the invention, a raising or lowering operation and speed control thereof are accomplished by a simple operation that the grip is moved upwardly or downwardly. Therefore, the electric chain block has a superior advantage in that changing the raising and lowering operations and speed control thereof are effected by the operator in the same sense as the operator raises and lowers the heavy object by himself.

It is further understood by those skilled in the art that the foregoing description that of preferred embodiments of the disclosed devices and that various changes and modifications may be made in the invention without departing from the spirit and scope thereof.

What is claimed is:

1. An operating device for an electric chain block having an electric motor for raising and lowering operations, said operating device comprising; a cylinder body interposed between one end of a chain for raising and lowering an object and a hook for hanging the object, a cylindrical grip fitted on said cylinder body and slidable upwardly and downwardly over predetermined distances relative to said cylinder body, movement detecting means provided in the cylinder body for detecting upward and downward movements of said cylindrical grip, moved distance detecting means provided in the cylinder body for detecting distances of said upward and downward movements of the cylindrical grip, and control means for energizing said electric motor to rotate it in normal and reverse directions in response to output of said movement detecting means according to the upward and downward movements of said cylindrical grip, respectively, and controlling rotating speeds of said electric motor in response to output of said moved distance detecting means, wherein said moved distance detecting means comprises a light emission element, a light reception element and light changing means interposed between the light emission element and the light reception element for changing amount of light received by said light reception element in response to distances of the upward and downward movements of the cylindrical grip.

2. An operating device as set forth in claim 1, wherein said light changing means is a plate-like body formed with a pair of trapezoid slits and movable together with said cylindrical grip.

3. An operating device as set forth in claim 1, wherein said cylindrical grip is provided therein with a part fixing member fixed to the cylindrical grip by means of fastening means guided in slots formed in the cylinder body, and coil springs for supporting said part fixing member at a substantially mid portion of the cylinder body.

* * * * *